United States Patent
Yang et al.

(10) Patent No.: US 10,732,430 B2
(45) Date of Patent: Aug. 4, 2020

(54) DISPLAY DEVICE AND DISPLAY METHOD

(71) Applicant: BOE Technology Group Co., Ltd., Beijing (CN)

(72) Inventors: Ming Yang, Beijing (CN); Xiaochuan Chen, Beijing (CN); Wenqing Zhao, Beijing (CN); Pengcheng Lu, Beijing (CN); Qian Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 262 days.

(21) Appl. No.: 15/750,370

(22) PCT Filed: Jun. 27, 2017

(86) PCT No.: PCT/CN2017/090364
§ 371 (c)(1),
(2) Date: Feb. 5, 2018

(87) PCT Pub. No.: WO2018/040699
PCT Pub. Date: Mar. 8, 2018

(65) Prior Publication Data
US 2019/0011716 A1    Jan. 10, 2019

(30) Foreign Application Priority Data
Aug. 30, 2016 (CN) .......................... 2016 1 0772867

(51) Int. Cl.
*G02B 27/22* (2018.01)
*G02B 5/18* (2006.01)
(Continued)

(52) U.S. Cl.
CPC ........... *G02B 30/27* (2020.01); *G02B 5/1842* (2013.01); *H04N 13/31* (2018.05); *H04N 13/317* (2018.05); *H04N 13/373* (2018.05)

(58) Field of Classification Search
CPC .................................................. G02B 5/1842; G02B 27/2214; G02B 27/225; G02B 27/22; G02B 27/26;
(Continued)

(56) References Cited

U.S. PATENT DOCUMENTS

2005/0041162 A1    2/2005 Lee et al.
2009/0009426 A1*   1/2009 Lee ...................... G02B 27/225
                                                    345/6
(Continued)

FOREIGN PATENT DOCUMENTS

CN    102902003 A    1/2013
CN    103293733 A    9/2013
(Continued)

OTHER PUBLICATIONS

Sep. 29, 2017—(WO) International Search Report and Written Opinion Appn PCT/CN2017/090364 with English Translation.
(Continued)

*Primary Examiner* — William R Alexander
*Assistant Examiner* — Ephrem Z Mebrahtu
(74) *Attorney, Agent, or Firm* — Banner & Witcoff, Ltd.

(57) ABSTRACT

A display device and a display method are provided, and the display device includes: a first panel which includes a plurality of light-blocking units and a plurality of pixels, each of the light-blocking units being between the pixels adjacent to each other; and a second panel which includes a first light-emitting plate provided with a plurality of light-emitting units, a distance from the light-emitting units to the first panel being one of H1=BS/(L−B), H2=(P−B)S/(L−P+B) and H3=PS/(L−P), in which B is a width of each of the light-blocking units between the pixels adjacent to each other, S is a viewing distance for a viewer, L is a pupillary distance between a left eye and a right eye of the viewer, and P is a pitch of the pixels of the first panel.

17 Claims, 3 Drawing Sheets

(51) Int. Cl.
*G02B 30/27* (2020.01)
*H04N 13/373* (2018.01)
*H04N 13/31* (2018.01)
*H04N 13/317* (2018.01)

(58) Field of Classification Search
CPC .... H04N 13/31; H04N 13/317; H04N 13/373; H04N 13/32
See application file for complete search history.

(56) References Cited

U.S. PATENT DOCUMENTS

| | | | |
|---|---|---|---|
| 2011/0102422 A1 | 5/2011 | Park et al. | |
| 2012/0242568 A1* | 9/2012 | Kim | G02B 27/2214 345/156 |
| 2013/0027909 A1* | 1/2013 | Kim | G02F 1/133603 362/97.2 |
| 2013/0088486 A1* | 4/2013 | Yoon | G02B 27/2214 345/419 |
| 2013/0181895 A1* | 7/2013 | Kim | G09G 3/34 345/156 |
| 2013/0182085 A1* | 7/2013 | Ziarati | A61B 5/055 348/51 |
| 2013/0194252 A1* | 8/2013 | Kim | G06T 15/00 345/419 |
| 2014/0104683 A1* | 4/2014 | Huang | G02B 30/27 359/464 |
| 2015/0109666 A1 | 4/2015 | Wei et al. | |
| 2015/0309319 A1 | 10/2015 | Wei | |
| 2016/0047954 A1 | 2/2016 | Wang | |
| 2016/0306181 A1 | 10/2016 | Liu et al. | |
| 2017/0084213 A1 | 3/2017 | Yang et al. | |

FOREIGN PATENT DOCUMENTS

| | | |
|---|---|---|
| CN | 103454807 A | 12/2013 |
| CN | 103698828 A | 4/2014 |
| CN | 103792607 A | 5/2014 |
| CN | 103852819 A | 6/2014 |
| CN | 104536145 A | 4/2015 |
| CN | 105093553 A | 11/2015 |
| CN | 105739108 A | 7/2016 |
| JP | 10227998 | 8/1998 |
| JP | 2016048315 A | 4/2016 |

OTHER PUBLICATIONS

Mar. 4, 2019—(CN) First Office Action Appn 201610772867.8 with English Translation.

* cited by examiner

DISPLAY DEVICE AND DISPLAY METHOD

The application is a U.S. National Phase Entry of International Application No. PCT/CN2017/090364 filed on Jun. 27, 2017, designating the United States of America and claiming priority to Chinese Patent Application No. 201610772867.8 filed on Aug. 30, 2016. The present application claims priority to and the benefit of the above-identified applications and the above-identified applications are incorporated by reference herein in their entirety

TECHNICAL FIELD

Embodiments of the present disclosure relate to a display device and a display method.

BACKGROUND

A 2D (two-dimensional) display can not display a 3D (three-dimensional) image directly. The key to enable a viewer to see the 3D mage is to make a parallax between an image viewed by a left eye of the viewer and an image viewed by a right eye of the viewer, so that a stereoscopic effect is produced after the two images are fused by the viewer's brain.

3D display technologies include a naked eye type 3D display technology and a spectacle type 3D display technology, and the naked eye type 3D display technology has obtained more attentions than the spectacle type 3D display technology because it does not need to wear glasses. The gratings-type naked eye 3D display technology has become a common naked eye 3D display technology because of its advantages of simple process, small crosstalk and the like. With the development of 3D display technology, the display device that can realize the switch between 2D display and 3D display will be the mainstream product of the naked eye 3D display.

SUMMARY

At least one embodiment of the present disclosure relate to a display device and a display method. The display device is a 2D/3D switchable display device.

At least one embodiment of the present disclosure provides a display device, and the display device includes a first panel and a second panel; the first panel includes a plurality of light-blocking units and a plurality of pixels, and each of the light-blocking units is between the pixels adjacent to each other; and the second panel includes a first light-emitting plate, the first light-emitting plate includes a plurality of light-emitting units, and a distance from the light-emitting units of the first light-emitting plate to the first panel is one of a first distance $H1=BS/(L-B)$, a second distance $H2=(P-B)S/(L-P+B)$ and a third distance $H3=PS/(L-P)$. In the display device, B is a width, between the pixels adjacent to each other, of each of the light-blocking units, $B0-b \leq B \leq B0+b$, B0 is an optimum width of each of the light-blocking units between the pixels adjacent to each other, b is a maximum allowable deviation of each of the light-blocking units relative to B0, and $b/B0 \leq 50\%$; S is a viewing distance for a viewer, $S0-s \leq S \leq S0+s$, S0 is an optimum viewing distance, s is a maximum allowable back-or-forth deviation relative to the optimum viewing distance S0, and $s/S0 \leq 20\%$; L is a pupillary distance between a left eye and a right eye of the viewer, $L0-l \leq L \leq L0+l$, L0 is an optimum pupillary distance, l is a maximum deviation relative to the optimum pupillary distance L0, and $l/L0 \leq 10\%$; and P is a pitch of the pixels of the first panel.

For example, the distance from the light-emitting units of the first light-emitting plate to the first panel is a distance from a plane provided with upper surfaces of the light-emitting units to a plane provided with upper surfaces of the light-blocking units of the first panel.

For example, the second panel further includes a second light-emitting plate, the second light-emitting plate includes a plurality of light-emitting units, and a distance from the light-emitting units included in the second light-emitting plate to the first panel is one of the first distance H1, the second distance H2 and the third distance H3 and is different from the distance from the light-emitting units included in the first light-emitting plate to the first panel.

For example, the second light-emitting plate is at a side of the first light-emitting plate away from the first panel, and the first light-emitting plate is a transparent light-emitting substrate.

For example, the second panel further includes a third light-emitting plate, the third light-emitting plate includes a plurality of light-emitting units, and a distance from the light-emitting units included in the third light-emitting plate to the first panel is one of the first distance H1, the second distance H2 and the third distance H3 and is different from the distance from the light-emitting units included in the first light-emitting plate to the first panel and the distance from the light-emitting units included in the second light-emitting plate to the first panel.

For example, the display device further includes a frame, the frame includes a first installation component and a second installation component, the first installation component is configured to receive the first light-emitting plate, and the second installation component is configured to receive the second light-emitting plate.

For example, the frame further includes a distance adjustment component, and the distance adjustment component is configured to adjust at least one of a distance from the first installation component to the first panel and a distance from the second installation component to the first panel.

For example, the distance from the light-emitting units included in the first light-emitting plate to the first panel is configured to switch among the first distance, the second distance and the third distance.

For example, the display device further includes an amplifier component, the amplifier component is between the first panel and the first light-emitting plate of the second panel, and the amplifier component is configured to comprise a plurality of convex lens equivalents in a case that the first light-emitting plate is located at the second distance or the third distance.

For example, the distance from the light-emitting units included in the first light-emitting plate to the first panel is the first distance or the second distance, the plurality of light-emitting units include the light-emitting units respectively in a plurality of sub regions, and each of the sub regions includes a left eye region and a right eye region; light emitted from the light-emitting units in the left eye region is configured to reach the left eye of the viewer after respectively passing through the pixels of the first panel and not to reach the right eye of the viewer; and light emitted from the light-emitting units in the right eye region is configured to reach the right eye of the viewer after respectively passing through the pixels of the first panel and not to reach the left eye of the viewer.

For example, the distance from the light-emitting units included in the first light-emitting plate to the first panel is the first distance, each of the sub regions is provided with a 2D region, and light emitted from each of the light-emitting units in the 2D region is configured to reach the left eye of the viewer and the right eye of the viewer after passing through a same pixel of the first panel.

For example, both a width of the left eye region and a width of the right eye region are LB/(L−B), and a width of the 2D region is L(P−2B)/(L−B).

For example, the distance from the light-emitting units included in the first light-emitting plate to the first panel is the second distance, each of the sub regions is provided with a 3D region, and light emitted from each of the light-emitting units in the 3D region is configured to reach the left eye of the viewer and the right eye of the viewer after passing through different pixels of the first panel.

For example, both a width of the left eye region and a width of the right eye region are LB/(L−P+B), and a width of the 3D region is L(P−2B)/(L−P+B).

For example, the distance from the light-emitting units included in the first light-emitting plate to the first panel is the third distance H3, the plurality of light-emitting units include the light-emitting units respectively in a plurality of sub regions, each of the sub regions includes a dark region and a 3D region, light emitted from each of the light-emitting units in the 3D region is configured to reach the left eye of the viewer and the right eye of the viewer after passing through different pixels of the first panel, and light from the dark region is configured not to reach both the left eye of the viewer and the right eye of the viewer; and a ratio of a width of the 3D region to a width of the dark region is (P−B)/B.

For example, there is no light-emitting unit in the dark region.

For example, the width of the 3D region is L (P−B)/(L−P), and the width of the dark region is LB/(L−P).

For example, each of the light-emitting units includes a light-emitting diode.

At least one embodiment of the present disclosure further provides a display method of a display device. The display device includes a first panel and a second panel; the first panel includes a plurality of light-blocking units and a plurality of pixels, and each of the light-blocking units is between the pixels adjacent to each other; and the second panel includes a light-emitting plate, the light-emitting plate includes a plurality of light-emitting units, and a distance from the light-emitting units to the first panel is one of a first distance H1=BS/(L−B), a second distance H2=(P−B)S/(L−P+B) and a third distance H3=PS/(L−P). B is a width of each of the light-blocking units between the pixels adjacent to each other, B0−b≤B≤B0+b, B0 is an optimum width of each of the light-blocking units between the pixels adjacent to each other, b is a maximum allowable deviation of the light-blocking units relative to B0, and b/B0≤50%; S is a viewing distance for a viewer, S0−s≤S≤S0+s, S0 is an optimum viewing distance, s is a maximum allowable back-or-forth deviation relative to the optimum viewing distance S0, and s/S0≤20%; L is a pupillary distance between a left eye and a right eye of the viewer, L0−l≤L≤L0+l, L0 is an optimum pupillary distance, l is a maximum deviation relative to the optimum pupillary distance L0, and l/L0≤10%; and P is a pitch of the pixels of the first panel. The display method includes: controlling a light-emitting state of the light-emitting units to make the display device realize a 2D display or a 3D display.

For example, the distance from the light-emitting units to the first panel is the first distance or the second distance, and the plurality of light-emitting units include the light-emitting units respectively in a plurality of sub regions, and each of the sub regions includes a left eye region and a right eye region; light emitted from the light-emitting units in the left eye region is configured to reach the left eye of the viewer after respectively passing through the pixels of the first panel and not to reach the right eye of the viewer; and light emitted from the light-emitting units in the right eye region is configured to reach the right eye of the viewer after respectively passing through the pixels of the first panel and not to reach the left eye of the viewer.

For example, the distance from the light-emitting units to the first panel is the first distance, each of the sub regions is provided with a 2D region, and light emitted from each of the light-emitting units in the 2D region is configured to reach the left eye of the viewer and the right eye of the viewer after passing through a same pixel of the first panel. Controlling the light-emitting state of the light-emitting units in the display method includes: controlling the light-emitting units in the 2D region included in each of the sub regions to be turned on to realize the 2D display; or controlling the light-emitting units in the 2D region included in each of the sub regions to be turned off, and controlling the light-emitting units respectively in the left eye region and the right eye region of each of the sub regions to be turned on, to realize the 2D display; or controlling the light-emitting units in the 2D region included in each of the sub regions to be turned off, and for the sub regions adjacent to each other, controlling the light-emitting units respectively in the left eye region and the right eye region included in one sub region to be turned on and controlling the light-emitting units respectively in the left eye region and the right eye region included in the other sub region to be turned off to achieve the 3D display.

For example, the distance from the light-emitting units to the first panel is the second distance, each of the sub regions is provided with a 3D region, light emitted from each of the light-emitting units in the 3D region is configured to reach the left eye of the viewer and the right eye of the viewer after passing through different pixels of the first panel. Controlling the light-emitting state of the light-emitting units in the display method includes: controlling the light-emitting units in the 3D region included in each of the sub regions to be turned on to realize the 2D display; or controlling the light-emitting units respectively in the left eye region and the right eye region of each of the sub regions to be turned on and controlling the light-emitting units in the 3D region included in each of the sub regions to be turned off, to realize the 2D display; or, for the sub regions adjacent to each other, controlling the light-emitting units in the 3D region included in one sub region to be turned on and controlling the light-emitting units in 3D region included in the other sub region to be turned off, to achieve the 3D display.

For example, the distance from the light-emitting units to the first panel is the third distance H3, the plurality of light-emitting units include the light-emitting units respectively in a plurality of sub regions, each of the sub regions includes a dark region and a 3D region, light emitted from each of the light-emitting units in the 3D region is configured to reach the left eye of the viewer and the right eye of the viewer after passing through different pixels of the first panel, and light from the dark region is configured not to reach both the left eye and the right eye of the viewer; and a ratio of a width of the 3D region to a width of the dark region is (P−B)/B. Controlling the light-emitting state of the light-emitting units in the display method includes: controlling the light-emitting units in the 3D region included in each of the sub regions to emit light to realize the 2D display; or, for the sub regions adjacent to each other, controlling the light-emitting units in the 3D region included in one sub region to emit light and controlling the light-emitting units in the 3D region included in the other sub region not to emit light, to achieve the 3D display.

The embodiments of the present disclosure provide the display device and the display method, and the display device includes the first panel and the second panel, the second panel includes the light-emitting plate including the plurality of light-emitting units; and by arranging a placement height of the light-emitting plate and controlling a light-emitting state of the plurality of light-emitting units, the display device achieves the 2D display and the 3D display, so that the display device is the 2D/3D switchable display device.

BRIEF DESCRIPTION OF THE DRAWINGS

In order to clearly illustrate the technical solution of the embodiments of the present disclosure, the drawings of the embodiments will be briefly described in the following, it is obvious that the described drawings are only related to some embodiments of the present disclosure and thus are not limitative of the present disclosure.

DETAILED DESCRIPTION

In order to make objects, technical details and advantages of the embodiments of the invention apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the words, such as "comprise/comprising", "include/including", etc., mean the components or objects that appear in front of the words to cover the similar components or objects that are listed in the following of the words, but other different components or objects are not excluded. The phrases "connect", "connected", etc., are not limited to a physical connection or mechanical connection, but may include an electrical connection, directly or indirectly. The terms "up", "down", "left", "right", etc., are used to indicate the relative position relation, when the absolute position of the described object is changed, the relative position relation may also be changed accordingly.

The embodiments of the present disclosure provide a display device and a display method, the display device includes a first panel and a second panel, the second panel includes a light-emitting plate including a plurality of light-emitting units; and by arranging a placement height of the light-emitting plate and controlling a light-emitting state of the plurality of light-emitting units, the display device achieves a 2D display or a 3D display, so that the display device is a 2D/3D switchable display device.

Figure 1:
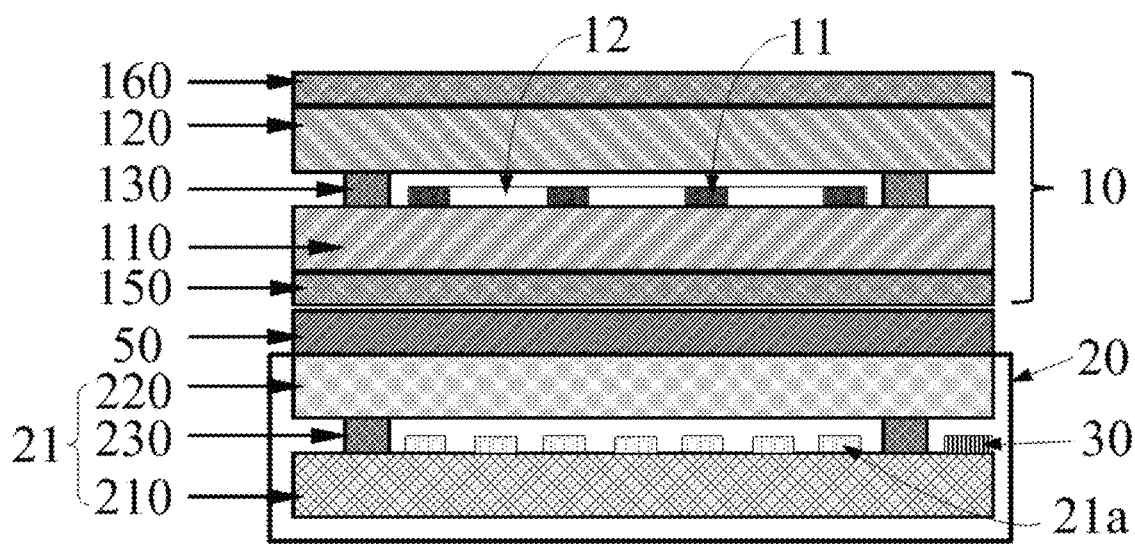
FIG. 1 is a schematic view of a display device provided by embodiments of the present disclosure.

At least one embodiment of the present disclosure provides a display device, as illustrated in FIG. 1, the display device includes a first panel 10 and a second panel 20 located at a back side of the first panel 10. For example, the first panel 10 is a display panel, and the second panel 20 is a backlight source for providing backlight to the first panel 10; or the first panel 10 is a grating, and the second panel 20 is a display panel (in this case, for example, the first panel 10 displays black and white, and the second panel 20 displays color). For example, the display device provided by at least one embodiment of the present disclosure further includes a controller 30 that controls the display device to realize the 2D display or the 3D display. For example, the display device provided by at least one embodiment of the present disclosure further includes an optical transparent adhesive 50 connecting the first panel 10 and the second panel 20.

The first panel 10 includes a plurality of light-blocking units 11 and a plurality of pixels 12. The light-blocking units 11 do not allow the light from the second panel 20 to pass through, and each of the light-blocking units 11 is arranged between the pixels 12 adjacent to each other. It should be noted that, for example, the first panel includes a black matrix layer in a grid shape, the black matrix layer includes a plurality of first black matrix patterns and a plurality of second black matrix patterns, the first black matrix patterns and the second black matrix patterns intersect with each other to form a plurality of openings, the pixels 12 are respectively in the openings of the black matrix layer in a grid shape. For example, the light-blocking units 11 in the embodiments of the present disclosure are one of the first black matrix patterns and the second black matrix patterns of the black matrix layer, and the pixels 12 correspond to the openings of the black matrix layer respectively.

For example, the first panel 10 is a liquid crystal panel, and the liquid crystal panel includes an array substrate 110 and an opposite substrate 120, the array substrate 110 and the opposite substrate 120 are joined together to form a sealing cavity through a sealant 130, and a liquid crystal material is filled in the sealing cavity. For example, the first panel 10 includes an upper polarizer 160 disposed at a display side of the first panel 10 and a lower polarizer 150 disposed at a backlight side of the first panel 10. The embodiments of the first panel 10 include, but are not limited to the liquid crystal panel, and the first panel 10 may be any other light modulation type panel that needs to use the second panel.

The second panel 20 includes a first light-emitting plate 21, the first light-emitting plate 21 includes a plurality of light-emitting units 21a that arranged, for example, side by side, and the placement height of the first light-emitting plate 21 (that is a distance from the light-emitting units 21a to the first panel 10, further a distance from a plane provided with upper surfaces of the light-emitting units 21a to a plane provided with upper surfaces of the light-blocking units 11 of the first panel) is approximately one of a first distance $H1=BS/(L-B)$, a second distance $H2=(P-B)S/(L-P+B)$ and a third distance $H3=PS/(L-P)$.

The parameters in the formulas of H1, H2, and H3 are explained in detail as follows.

B is a width of each of the light-blocking units 11 and between adjacent pixels 12, $B0-b \leq B \leq B0+b$, B0 is an optimum width (that is, a design width in a process of designing product) of each of the light-blocking units between the pixels adjacent to each other, b is a maximum allowable deviation of each of the light-blocking units relative to the B0, and $b/B0 \leq 50\%$. The design of B0 affects the whole brightness and the 3D continuous viewing space of the display device. The larger the b is, the smaller the B0−b is, then the higher the whole brightness of the display device is, and the smaller the 3D continuous viewing space. Meanwhile, the larger the B0+b is, the smaller the whole brightness of the display device is, and the larger the 3D continuous viewing space is.

S is a viewing distance for a viewer, and $S0-s \leq S \leq S0+s$, in which S0 is an optimum viewing distance (that is, a design viewing distance in the process of designing product), s is a maximum allowable back-or-forth deviation relative to the optimum viewing distance S0, and s/S0 is smaller than or equal to 20%. At the optimum viewing distance, the viewer obtains an optimum 3D effect (that is to say, at the optimum viewing distance, the 3D continuous viewing space is the largest). In a case that the viewer deviates from the optimum viewing distance, the 3D continuous viewing space decreases. S0−s indicates a position in front of the optimum viewing distance, that is, a position of the eyes of the viewer close to the screen of the display device. A crosstalk phenomenon will occur if the eyes of the viewers are too close to the screen. S0+s indicates a position at the back of the optimum viewing distance, that is, a position of the eyes of the viewer away from the screen. A crosstalk phenomenon will occur if the eyes of the viewer are too far from the screen.

L is a pupillary distance between the left eye and the right eye of the viewer, $L0-l \leq L \leq L0+l$, L0 is an optimum pupillary distance (that is, a design pupillary distance in the process of designing product), for example, L0 is the pupil spacing of normal adults, which is about 65 mm, l is a maximum deviation relative to the optimum pupillary distance L0, and $l/L0 \leq 10\%$.

P is a pitch (that is a distance between middle points of the adjacent pixels 12) of the pixels 12 of the first panel.

For example, the light-emitting units 21a included in the first light-emitting plate 21 are self-luminescent devices, and each of the light-emitting units 21a includes a cathode, an anode, and a light-emitting layer between the cathode and the anode. For example, the light-emitting units 21a are LEDs (light-emitting diodes), for example, OLEDs (organic light-emitting diodes), or similar light-emitting devices.

It should be noted that, compared with the placement height of the first light-emitting plate 21, a distance between the array substrate 110 and the opposite substrate 120 in the first panel 10 is smaller, which can be ignored, so the light light-blocking units 11 in the first panel 11 are arranged at the array substrate 110 or at the opposite substrate 120, for example.

The controller 30 is electrically connected with the light-emitting units 21a in the first light-emitting plate 21, and the controller 30 is configured to control the luminous state of the light-emitting units 21a, so that the display device can realize 2D display or 3D display. For example, the controller 30 controls all of the light-emitting units 21a to be turned on to realize the 2D display; or the controller 30 controls a portion of the light-emitting units 21a to be turned on and controls the other portion of the light-emitting units 21a to be turned off to achieve 2D display or 3D display.

In at least one embodiment of the present disclosure, the controller 30 controls a portion of the light-emitting units 21a to be turned on and controls the other portion of the light-emitting units 21a to be turned off, so that the first light-emitting plate 21 forms black stripes and bright stripes which are arranged alternately. In at least one embodiment, the black stripes and the bright stripes are combined to form a grating structure, and then the 3D display is realized. For the 2D display, in at least one embodiment, the controller 30 controls a portion of the light-emitting units 21a to be turned on and controls the other portion of the light-emitting units 21a to be turned off to control the distribution of the bright stripes, so that the 2D display is realized with a relatively small power consumption. In at least another embodiment, the controller 30 controls all of the light-emitting units 21a to be turned on to realize the 2D display, and relatively large display brightness is achieved.

For example, the controller 30 is a drive IC (Integrated circuit) or a similar circuit. It should be explained that, the position of the controller 30 is not limited in the embodiments of the present disclosure, for example, the controller 30 is disposed at the second panel 20, or disposed at the first panel 10, or disposed outside the second panel 20 and the first panel 10.

Figure 2:
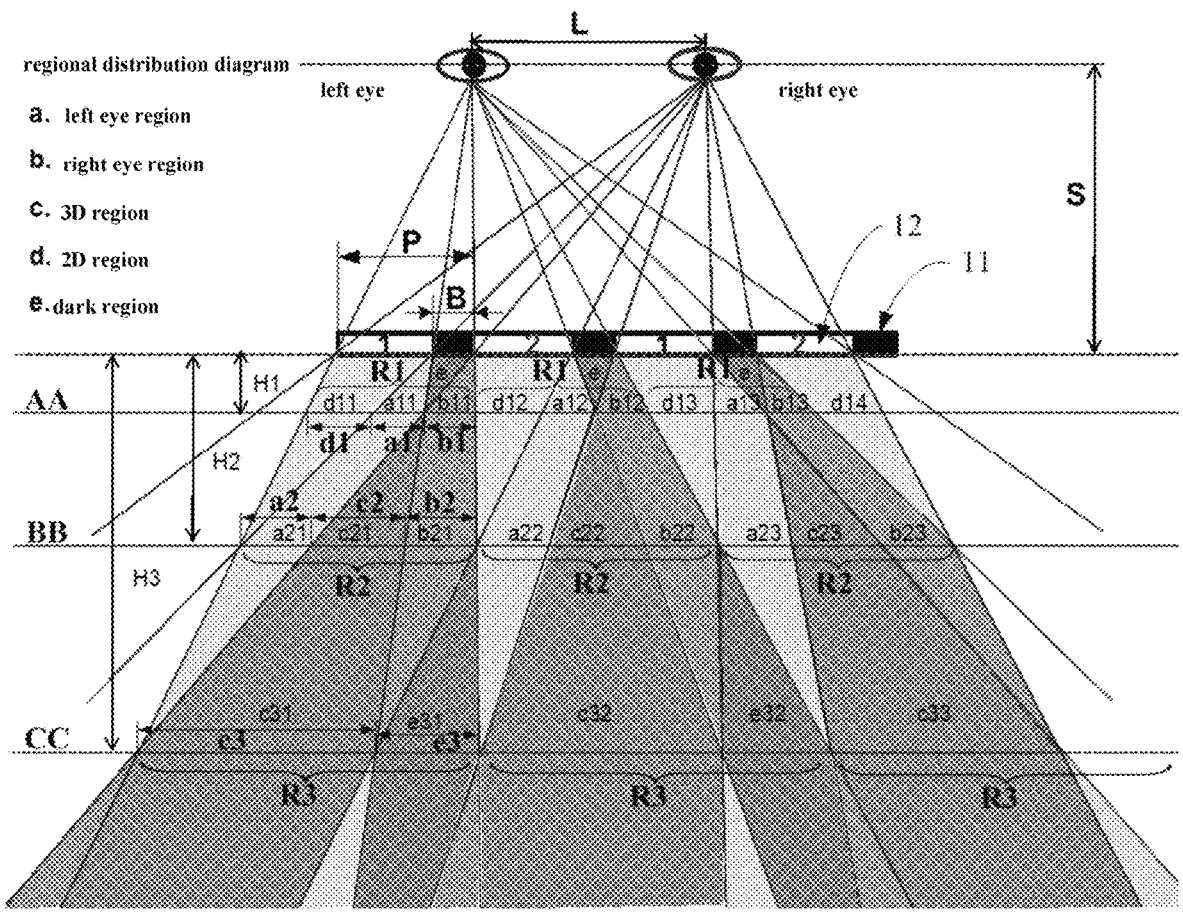
FIG. 2 is an optical path diagram that a first light-emitting plate of the display device is arranged at different placement heights provided by the embodiments of the present disclosure.

FIG. 2 is an optical path diagram that the first light-emitting plate of the display device is arranged at different placement heights. The manner that the display device provided by the embodiments of the present disclosure realizes the 2D display and the 3D display are described in detail below in connection with FIG. 2.

As illustrated in FIG. 2, the pitch of the pixels is P (P equals to a sum of a width of a light light-blocking unit 11 and a width of a pixel 12 which is adjacent to the light-blocking unit 11), a width of each of the light-blocking units is B; a pupillary distance of the viewer is L, a viewing distance for a viewer is S; and in the operation of the display device, the pixel 12 marked 1 is input with a left eye image, and the pixel 12 marked 2 is input with a right eye image.

Lines are drawn from the position of the eyes of the viewer to the edges of the pixels 12 and the edges of the light-blocking units 11 of the first panel respectively, and it can be seen that the back side region of the first panel is divided into 5 types of regions, namely the region a to the region e.

The region a is defined as a left eye region, that is, in a case that the light-emitting unit (such as an LED) in the region a is turned on, the light emitted by the light-emitting unit reaches the left eye of the viewer after passing through the pixel 12, and the light fails to reach the right eye of the viewer because of the blocking of the light-blocking unit 11.

The region b is defined as a right eye region, that is, in a case that the light-emitting unit in the region b is turned on, the light emitted by the light-emitting unit reaches the right eye of the viewer after passing through the pixel 12, and the light fails to reach the left eye of the viewer because of the blocking of the light-blocking unit 11.

The region c is defined as a 3D region, that is, in a case that the light-emitting unit in the region c is turned on, the light emitted by the light-emitting unit reaches the left eye and the right eye of the viewer after passing through two pixels 12 respectively.

The region d is defined as a 2D region, that is, in a case that the light-emitting unit in the region d is turned on, the light emitted by the light-emitting unit reaches the left eye and the right eye of the viewer after passing through a same pixel 12.

The region e is defined as a dark region, that is, in a case that the light unit in the region e is turned on, the light emitted by the light-emitting unit fails to reach the viewer because of the blocking of the light-blocking unit 11, so there is the light-emitting unit in the region e or there is no light-emitting unit in the region e.

In addition, it can be seen from FIG. 2 that, three kinds of distances H1, H2 and H3 are defined according to the horizontal connection lines of the intersections of four different regions in the five types of regions. For example, the horizontal line AA of the intersections of the left eye region a, the right eye region b, the 3D region c, and the dark region e defines the first distance H1; the horizontal line BB of the intersections of the left eye region a, the dark region e, the right eye region b and the 2D region d defines the second distance H2; and the horizontal line CC of the intersections of the left eye region a, the 3D region c, the right eye region b, and the dark region e defines the third distance H3.

The widths of each of the regions at each of the distances are described below.

For the first distance H1, the width of the region a, the width of the region b, and the width of the region d at the horizontal line AA at the first distance H1 are represented by a1, b1, and d1, respectively, and the relational expressions $L/a1=S/H1$ and $B/a1=S/(S+H1)$ can be obtained according to geometric relations. Then, it can be obtained: $H1=BS/(L-B)$ and $a1=LB/(L-B)$; in the same way, it can be obtained: $b1=LB/(L-B)$ and $d1=L(P-2B)/(L-B)$.

For the second distance H2, the width of the region a, the width of the region c, and the width of the region b at the horizontal line BB at the second distance H2 are represented by a2, c2 and b2, respectively; and similarly, the parameters at the second distance H2 can be obtained: $H2=(P-B)S/(L-P+B)$, $a2=b2=LB/(L-P+B)$ and $c2=L(P-2B)/(L-P+B)$.

For the third distance H3, the width of the region c and the width of the region e at the horizontal line CC at the third distance H3 are represented by c3 and e3, respectively, and similarly, the parameters at the third distance H3 can be obtained: $H3=PS/(L-P)$, $c3=L(P-B)/(L-P)$ and $e3=LB/(L-P)$.

To sum up, the widths of the regions at all of the distances are illustrated in the following table:

| region | $H1 = BS/(L-B)$ | $H2 = (P-B)S/(L-P+B)$ | $H3 = PS/(L-P)$ |
|---|---|---|---|
| a | $LB/(L-B)$ | $LB/(L-P+B)$ | — |
| b | $LB/(L-B)$ | $LB/(L-P+B)$ | — |
| c | — | $L(P-2B)/(L-P+B)$ | $L(P-B)/(L-P)$ |
| d | $L(P-2B)/(L-B)$ | — | — |
| e | — | — | $LB/(L-P)$ |

It can be seen from the above description that, as illustrated in FIG. 2, in a case that the distance from the light-emitting units (not illustrated in FIG. 2) included in the first light-emitting plate to the first panel (referring to the light-blocking unit 11) is the first distance H1 or the second distance H2, the light-emitting units include the light-emitting units respectively in a plurality of sub regions (referring to R1 and R2), each of the sub regions includes the left eye region a and the right eye region b; the light emitted from each of the light-emitting units in the left eye region a reaches the left eye of the viewer after passing through the pixel 12 of the first panel 12 and can not reach the right eye of the viewer; and the light emitted from each of the light-emitting units in the right eye region b reaches the right eye of the viewer after passing through the pixel 12 of the first panel 12 and can not reach the left eye of the viewer.

For example, in a case that the distance from the light-emitting units included in the first light-emitting plate to the first panel is the first distance H1, the left eye region a and the right eye region b included in each of the sub regions R1 are adjacent to each other, each of the sub regions R1 further includes the 2D region d, and the light emitted from each of the light-emitting units in the 2D region d arrives at the left eye and the right eye of the viewer after passing through a same pixel 12 of the first panel.

For example, at the position of the first distance H1, both the width a1 of the left eye region a and the width b1 of the right eye region b are $LB/(L-B)$, and the width d1 of the 2D region d is $L(P-2B)/(L-B)$.

For example, in a case that the distance from the light-emitting units included in the first light-emitting plate to the first panel is the second distance H2, each of the sub regions R2 further includes the 3D region c, and the light emitted from each of the light-emitting units in the 3D region c arrives at the left eye and the right eye of the viewer after passing through different pixels 12 of the first panel; and in each of the sub regions R2, the 3D region c is located between the left eye region a and the right eye region b.

For example, at the position of the second distance H2, both the width a2 of the left eye region a and the width b2 of the right eye region b are $LB/(L-P+B)$, and the width c2 of the 3D region c is $L(P-2B)/(L-P+B)$.

For example, in a case that the distance from the light-emitting units included in the first light-emitting plate to the first panel is the third distance H3, the light-emitting units of the first light-emitting plate include the light-emitting units respectively in a plurality of sub regions R3, each of the sub regions R3 includes the dark region e and the 3D region c, the light emitted from each of the light-emitting units in the 3D region c reaches the left eye and the right eye of the viewer after passing through different pixels 12 of the first panel, and both the left eye and the right eye of the viewer are unable to see the light from the dark region e; and a ratio of the width of the 3D region c to the width of the dark region e is $(P-B)/B$. For example, the width of the 3D region is $L(P-B)/(L-P)$, and the width of the dark region is $LB/(L-P)$.

Because the light from the dark region e is not seen by the viewer at the third distance H3, each of the light-emitting units in the dark region e can be turned off in the 2D display and in the 3D display. In this way, the power consumption of the display device is reduced.

For example, the dark region e is provided with no light-emitting unit. In this way, the cost of manufacturing the first light-emitting plate is reduced.

In a case that the placement height of the first light-emitting plate of the display device is any one of H1, H2 and H3, the display device can achieve both the 2D display and the 3D display. The following illustrates the embodiments of the 2D display and the 3D display at different placement heights.

In a case that the placement height of the first light-emitting plate is the first distance H1, the modes that the display device implements the 2D display and the 3D display are described as follows.

For example, in a case that the placement height of the first light-emitting plate is the first distance H1, in order to realize the 2D display, the controller (not illustrated in FIG. 2) is configured to control the light-emitting units in the 2D region d of each of the sub regions R1 to be turned on. For example, the method of turning on the light-emitting units in the 2D region d to realize the 2D display includes a first mode and a second mode as follows.

The first mode: turning on the light-emitting units in the 2D region d of each of the sub regions R1, and turning off the light-emitting units respectively in the left eye region a and the right eye region b included in each of the sub regions R1 to achieve the 2D display. In this way, the power consumption of the display device is minimal.

The second mode: turning on the light-emitting units respectively in the left eye region a, the right eye region b and the 2D region b included in each of the sub regions R1 to achieve the 2D display. In this way, the maximum brightness of 2D display is achieved.

In the first mode and the second mode of achieving 2D display at the first distance H1, for example, color display is achieved by setting a color filter layer in the first panel, or color display is achieved by controlling the color of the light emitted from the light-emitting units in the first light-emitting plate.

In a case that the placement height of the first light-emitting plate is the first distance H1, the embodiments of the 2D display include, but are not limited to, the first mode and the second mode. For example, the controller is configured to turn off the light-emitting units in the 2D region of each of the sub regions R1 and to turn on the light-emitting units respectively in the left eye region a and the right eye region b included in each of the sub regions R1, to achieve the 2D display. For example, in this mode, color display is achieved by controlling the color of the light emitted from the light-emitting units in the first light-emitting plate, and the color of the light emitted from the light-emitting units respectively in the left eye region a and the right eye region b are the same.

For example, in a case that the placement height of the first light-emitting plate is the first distance H1, in order to realize the 3D display, the controller is configured to control the light-emitting units to be turned off in the 2D region d of each of the sub regions R1, and the controller is configured to turn on the light-emitting units respectively in the left eye regions a and the right eye regions b included in the sub regions R1 which are spaced apart from each other (that is, the sub regions R1 which are not adjacent to each other). That is to say, in the adjacent sub regions R1, the controller is configured to turn on the light-emitting units respectively in the left eye region a and the right eye region b included in one sub region R1, and to turn off the light-emitting units respectively in the left eye region a and the right eye region b included in the other sub region R1. For example, as illustrated in FIG. 2, in order to realize the 3D display, the light-emitting units respectively in the regions d11, d12, d13, d14, a12 and b12 are turned off, and the light-emitting units respectively in the regions a11, b11, a13 and b13 are turned on. For example, in the 3D display, color display is achieved by controlling the color of the light emitted from the light-emitting units in the first light-emitting plate, and the color of light emitted from the light-emitting units respectively in the left eye region a and the right eye region b are the same.

In a case that the placement height of the first light-emitting plate is the second distance H2, the modes that the display device implements the 2D display and the 3D display is as follows.

For example, in a case that the placement height of the first light-emitting plate is the second distance H2, in order to realize the 2D display, the controller is configured to control the light-emitting units in the 3D region c of each of the sub regions R2 to be turned on. For example, the method of turning on the light-emitting units in the 3D region c to achieve 2D display includes a first mode and a second mode as follows.

The first mode: turning on the light-emitting units in the 3D region c of each of the sub regions R2 and turning off the light-emitting units respectively in the left eye region a and the right eye region b included in each of the sub regions R2, to achieve 2D display.

The second mode: turning on the light-emitting units respectively in the left eye region a, the right eye region b and the 3D region c included in each of the sub regions R2 to achieve 2D display. In this way, the left eye of the viewer can see the left eye region a and the 3D region c, the right eye of the viewer can see the right eye region b and the 3D region c, and the maximum brightness of 2D display is achieved.

In the first mode and the second mode of achieving 2D display at the second distance H2, for example, color display is achieved by setting a color filter layer in the first panel, or color display is achieved by controlling the color of the light emitted from the light-emitting units in the first light-emitting plate.

In a case that the placement height of the first light-emitting plate is the second distance H2, the embodiments of the 2D display include, but are not limited to, the first mode and the second mode. For example, the controller is configured to turn on the light-emitting units respectively in the left eye region a and the right eye region b included in each of the sub regions R2 and to turn off the light-emitting units in the 3D region c included in each of the sub regions R2 to achieve 2D display, and the power consumption of the display device in this mode is minimal. For example, in this mode, color display is achieved by controlling the color of the light emitted from the light-emitting units in the first light-emitting plate, and the color of light emitted from the light-emitting units respectively in the left eye region a and the right eye region b are the same.

For example, in a case that the placement height of the first light-emitting plate is the second distance H2, in order to realize the 3D display, for the sub regions R2 adjacent to each other, the controller is configured to control the light-emitting units in the 3D region c of one sub region R2 to be turned on and to control the light-emitting units in the 3D region c of the other sub region R2 to be turned off. For example, such method of turning on the light-emitting units respectively in the 3D regions c of the sub regions R2 which are spaced apart from each other to achieve 3D display includes a first mode and a second mode as follows.

The first mode: turning off the light-emitting units respectively in the left eye region a and the right eye region b included in each of the sub regions R2, and turning on the light-emitting units respectively in the 3D regions c included in the sub regions R2 which are spaced apart from each other. For example, as illustrated in FIG. 2, the light-emitting units respectively in the regions a21, b21, a22, b22, a23, b23 and c22 are turned off, and the light-emitting units respectively in the regions c21 and c23 are turned on. The power consumption of the display device in the 3D display mode is minimal.

The second mode: turning on the light-emitting units respectively in the left eye regions a, the right eye regions b and the 3D regions c included in the sub regions R2 which are spaced apart from each other. For example, as illustrated in FIG. 2, the light-emitting units respectively in the regions a21, c21 and b21 are turned on, the light-emitting units respectively in the regions a22, c22 and b22 are turned off, and the light-emitting units respectively in the regions a23, c23 and b23 are turned on. And in this way, the maximum brightness of 3D display is achieved.

In the first mode and the second mode of achieving 3D display at the second distance H2, for example, color display is achieved by setting a color filter layer in the first panel, or color display is achieved by controlling the color of the light emitted from the light-emitting units in the first light-emitting plate.

In a case that the placement height of the first light-emitting plate is the third distance H3, the modes that the display device implements the 2D display and the 3D display is as follows.

For example, in order to realize the 2D display, the controller is configured to control the light-emitting units in the 3D region c of each of the sub regions R3 to emit light.

For example, in order to realize the 3D display, for the adjacent sub regions R3, the controller is configured to control the light-emitting units in the 3D region c of one sub region R3 to emit light, and to control the light-emitting units in the 3D region c of the other sub region R3 not to emit light. That is to say, the light-emitting units respectively in the 3D regions c included in the sub regions R3 which are spaced apart from each other are turned on to realize the 3D display. For example, as illustrated in FIG. 2, the light-emitting units respectively in the regions c31 and c33 are turned on and the light-emitting units in the region c32 are turned off, to realize the 3D display.

In the mode of achieving 3D display at the third distance H3, for example, color display is achieved by setting a color filter layer in the first panel, or color display is achieved by controlling the color of the light emitted from the light-emitting units in the first light-emitting plate.

Through the above analysis, in the embodiments of the present disclosure, different regions are divided by light, and the concepts of three kinds of placement heights and five kinds of regions are put forward. The 2D display and 3D display are realized at different placement heights by the combination of turning on and turning off the light-emitting units in different regions.

It is obtained from FIG. 2 that H1=BS/(L−B), H2=(P−B)S/(L−P+B), H3=PS/(L−P), and H1<H2<H3. In this way, in the process of preparing display products, it is possible to obtain a better product form by selecting different placement heights of the first light-emitting plate. For example, in a case that the placement height H1 is selected, the placement height is minimized and a light and thin device is achieved. In a case that the placement height H2 is selected, the brightness of the 2D display and the brightness of the 3D display can be respectively the same as that at the placement height of the H3. For example, the brightness of the second mode of 2D display at the placement height H2 is the same as the brightness of the 2D display at the placement height H3, the brightness of the second mode of 3D display at the placement height H2 is the same as the brightness of the 3D display at the placement height H3, and the placement height H2 is obviously less than H3. For the placement height H3, in the case that the brightness of 2D display or 3D display is satisfied, the lighting emitting units in the dark region are turned off or there is no lighting emitting unit in the dark region, in this way, the power consumption of the display device is effective reduced.

For example, for TV products, because the viewing distance is large, the placement height of the second panel is usually large. In this way, under the premise of meeting the basic performance of products, a low placement height is selected, for example, H1 or H2; and for the mobile phones with high pixel density, limited by the process, a large placement height can be selected, such as H2 or H3.

Figure 3:
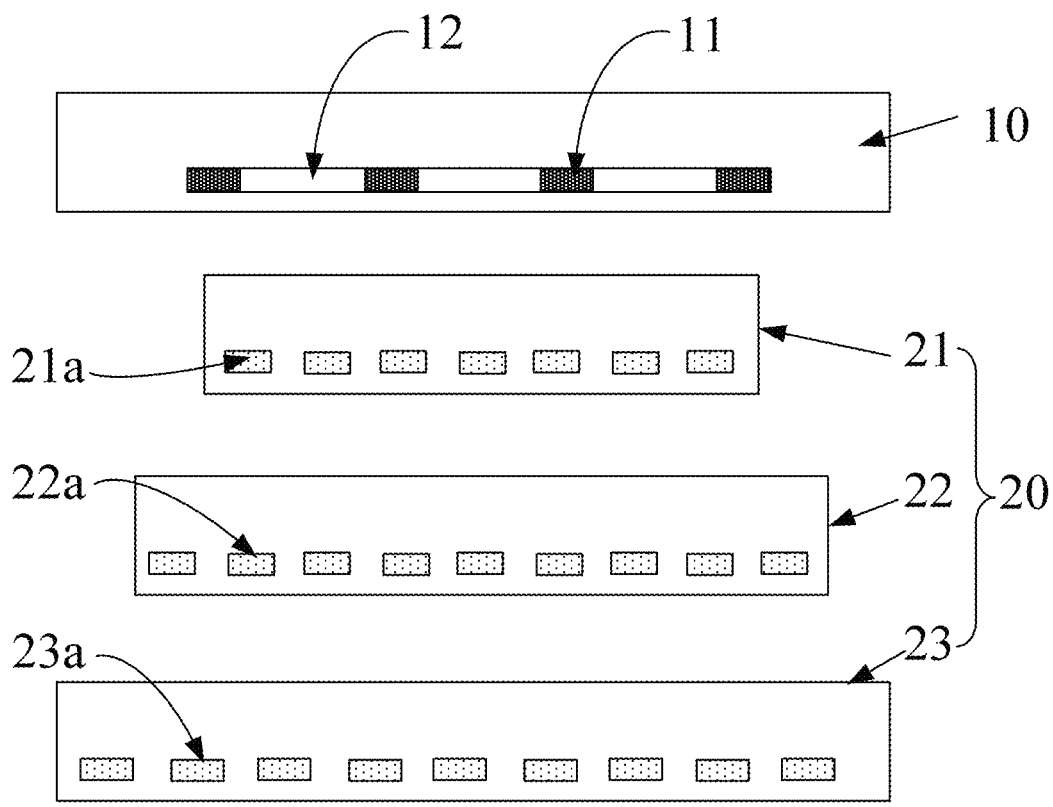
FIG. 3 is a schematic view of the display device provided by another embodiment of the present disclosure.

For example, as illustrated in FIG. 3, the second panel 20 further includes a second light-emitting plate 22, the second light-emitting plate 22 includes a plurality of light-emitting units 22a, and a distance from the light-emitting units 22a to the first panel 10 (referring the light-blocking units 11) is one of the first distance H1, the second distance H2 and the third distance H3 and is different from the distance from the light-emitting units 21a included in the first light-emitting plate 21 to the first panel 10, which allows a user to choose the light-emitting plate at different placement heights to achieve 2D display or 3D display to meet the different requirements of the user.

For example, the second light-emitting plate 22 is arranged at a side of the first light-emitting plate 21, which side is away from the first panel 10, and the first light-emitting plate 21 is a transparent light-emitting substrate. That is, in a case that the second light-emitting plate 22 works, the first light-emitting plate 21 is transparent. For example, the light-emitting units 21a in the first light-emitting plate 21 are transparent OLEDs or similar transparent light-emitting devices.

In addition to the manner that the first light-emitting panel and the second light-emitting panel are in a front and back arrangement, for example, the first light-emitting panel and the second light-emitting panel are arranged side by side, so that the viewers at different locations have different display effects.

In at least another embodiment, as illustrated in FIG. 3, the second panel 20 further includes a third light-emitting plate 23, the third light-emitting plate 23 includes a plurality of light-emitting units 23a, and a distance from the light-emitting units 23a to the first panel 10 (referring to the light-blocking units 11) is one of the first distance H1, the second distance H2 and the third distance H3, and is different from the distance from the light-emitting units included in the first light-emitting plate 21 to the first panel 10 and the distance from the light-emitting units included in the second light-emitting plate 22 to the first panel 10, which allows the user to choose the light-emitting plate at different placement heights to achieve 2D display or 3D display to meet the different requirements of the user.

For example, the third light-emitting plate 23 is arranged at a side of the second light-emitting plate 22, which side is away from the first panel 10, and the first light-emitting plate 21 and the second light-emitting plate 22 are transparent light-emitting substrates, so that the first light-emitting plate 21 and the second light-emitting plate 22 are transparent during the working process of the third light-emitting plate 23. For example, the light-emitting units 21a in the first light-emitting plate 21 and the light-emitting units 22a in the first light-emitting plate 22 are transparent OLEDs or similar transparent light-emitting devices.

For example, the third light-emitting panel is arranged side by side with at least one of the first light-emitting panel and the second light-emitting panel, in this way, the viewers at different locations have different display effects.

Figure 4:
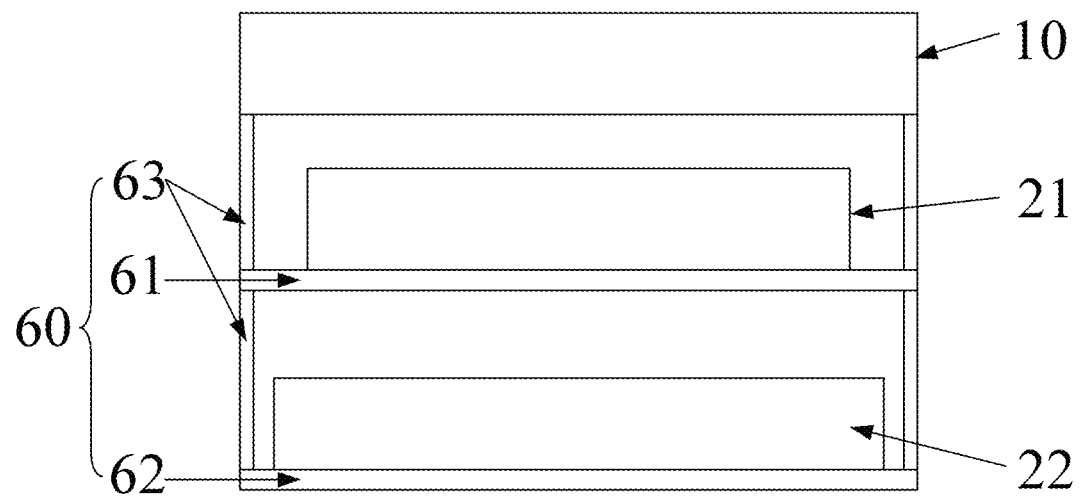
FIG. 4 is a schematic view of the display device provided by another embodiment of the present disclosure.

For example, as illustrated in FIG. 4, the display device provided by at least one embodiment of the present disclosure further includes a frame 60, the frame 60 includes a first installation component 61 and a second installation component 62, the first installation component 61 is configured to receive the first light-emitting plate 21, and the second installation component 62 is configured to receive the second light-emitting plate 22. For example, both the first installation component and the second installation component are brackets to receive the first light-emitting plate and the second light-emitting plate accordingly.

For example, the frame 60 further includes a distance adjustment component 63, and the distance adjustment component 63 is configured to adjust at least one of a distance from the first installation component 61 to the first panel 10 and a distance from the second installation component 62 to the first panel 10. For example, the distance adjustment device 63 is an extensible device (such as an extensible rod).

The implementations of the first installation component and the second installation component in the embodiments of the present disclosure include but not are limited to brackets, and embodiments of the distance adjustment component 63 include, but are not limited to the extensible device. In addition, for example, the frame 60 further includes a third installation component provided with the third light-emitting plate.

Figure 5:
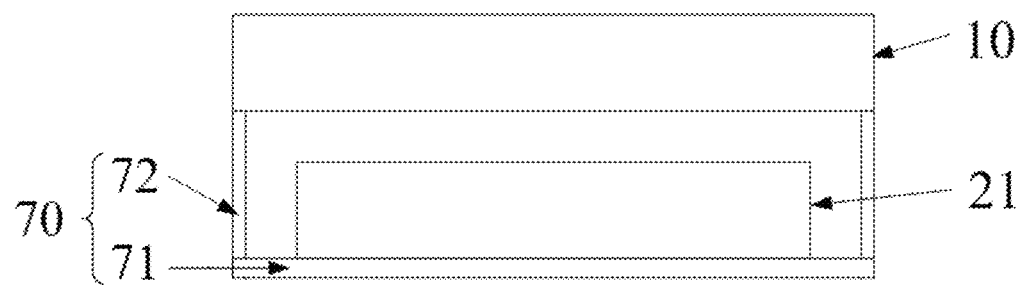
FIG. 5 is a schematic view of the display device provided by another embodiment of the present disclosure.

For example, the distance from the first light-emitting plate 21 to the first panel 10 is configured to switch among the first distance, the second distance and the third distance. For example, as illustrated in FIG. 5, the display device provided by at least one embodiment of the present disclosure further includes a frame 70, the frame 70 includes a support plate 71 for receiving the first light-emitting plate 21 and a distance adjustment component 72 connected with the support plate 71, and the distance adjustment component 72 is configured to adjust the distance between the support plate 71 and the first panel 10. For example, the distance adjustment device 72 is an extensible device (such as an extensible rod).

It can be seen from FIG. 2 that, at the placement height H1, the repetition period of the light-emitting units in the second panel is R1=a1+b1+d1=LP/(L−B); at the placement height H2, the repetition period of the light-emitting units in the second panel is R2=a2+b2+c2=LP/(L−P+B); and at the placement height H3, the repetition period of the light-emitting units in the second panel is R3=c3+e3=LP/(L−P). It can be found that the repetition period of the light-emitting units in the second panel is different at different placement heights.

Figure 6:
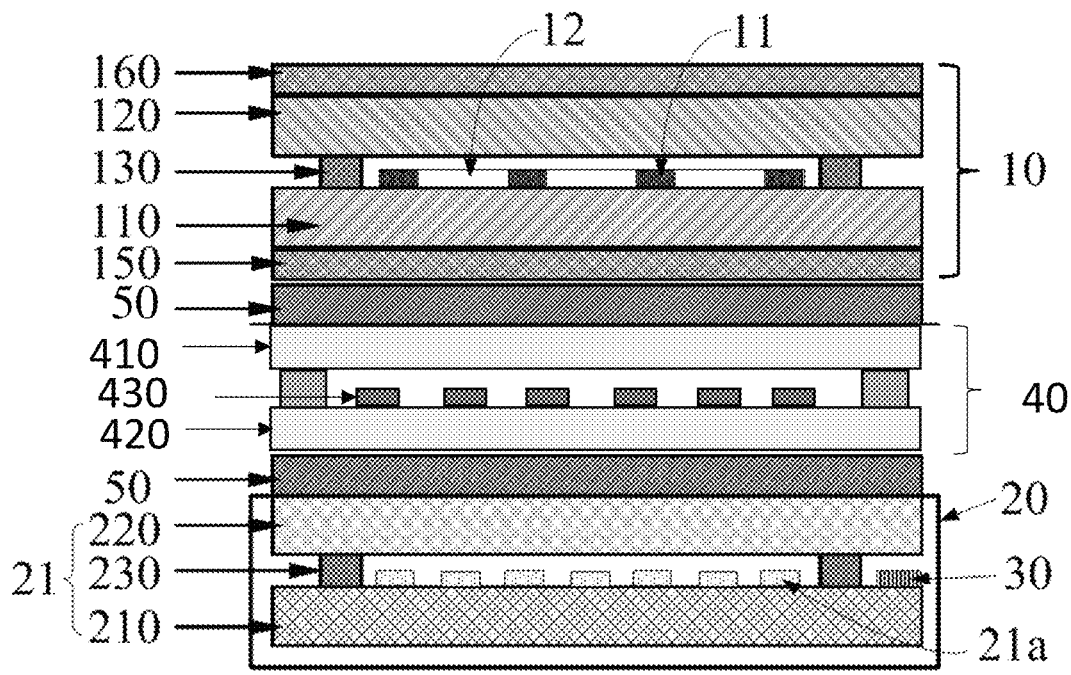
FIG. 6 is a schematic view of the display device provided by another embodiment of the present disclosure.

In the case that the placement heights of a same light-emitting plate can be switched mutually, in order to match the repetition period of the light-emitting units of the light-emitting plate with the corresponding placement height, for example, an amplifier component is disposed between the light-emitting plate and the first panel. For example, as illustrated in FIG. 6, the display device further includes an amplifier component 40, the amplifier component 40 is disposed between the first panel 10 and the first light-emitting plate 21 of the second panel 20, and the amplifier component 40 is configured to include a plurality of convex lens equivalents in a case that the first light-emitting plate 21 is located at the second distance or the third distance. For example, each of the convex lens equivalents corresponds to a light-emitting unit 21a of the first light-emitting plate 21.

For example, as illustrated in FIG. 6, the amplifier component 40 includes: an upper substrate 410 close to the first panel 10; a lower substrate 420 close to the second panel 20; and a plurality of strip electrodes 430, an electrode (for example, a surface electrode, not illustrated in the FIG. 6) located below the plurality of strip electrodes 430 and liquid crystal (not illustrated in the FIG. 6), which are between the upper substrate and the lower substrate. By loading electrical signals respectively on the strip electrodes 430 and the electrode below the strip electrodes 430, the amplifier component 40 equivalents to a plurality of convex lenses. The operating mode of the amplifier component 40 is as follows: in a case that the second panel (for example, the first light-emitting plate) is placed at the placement height of H1, the amplifier component 40 does not work; in a case that the second panel (for example, the first light-emitting plate) is placed at the placement height of H2, the amplifier component 40 works, and the magnification of the amplifier component 40 is M2=R2/R1=(L−B)/(L−P+B); and in a case that the second panel is placed at the placement height of H3, the amplifier component 40 works, and the magnification of the amplifier component 40 is M3=R3/R1=(L−B)/(L−P). For different placement heights, the magnifications of the amplifier component are different, and the magnifications are achieved, for example, by loading different voltages on the strip electrodes 430.

At least one embodiment of the present disclosure further provides a display method of the display device provided by any one of the embodiments described above. As illustrated in FIG. 1, the display device includes a first panel 10 and a second panel 20 located at a back side of the first panel 10; the first panel 10 includes a plurality of light-blocking units 11 and a plurality of pixels 12, and each of the light-blocking units 11 is disposed between adjacent pixels 12; and the second panel 20 includes a light-emitting plate (referring to the first light-emitting plate 21), the light-emitting plate includes a plurality of light-emitting units 21a, for example, which are arranged side by side, and a distance (for example, a distance from the light-emitting units 21a to the light-blocking units 11) from the light-emitting units 21a to the first panel is one of a first distance H1=BS/(L−B), a second distance H2=(P−B)S/(L−P+B) and a third distance H3=PS/(L−P). B is a width of each of the light-blocking units 11 between adjacent pixels 12, B0−b≤B≤B0+b, B0 is an optimum width (that is a design width) of each of the light-blocking units between adjacent pixels, b is a maximum allowable deviation of the light-blocking units relative to B0, and b/B0≤50%; S is a viewing distance for a viewer, S0−s≤S≤S0+s, S0 is an optimum viewing distance (that is a design optimum viewing distance), s is a maximum allowable back-or-forth deviation relative to the optimum viewing distance S0, and s/S0≤20%; L is a pupillary distance between a left eye and a right eye of the viewer, L0−l≤L≤L0+l, L0 is an optimum pupillary distance (that is a design pupillary distance), l is a maximum deviation relative to the optimum pupillary distance L0, and l/L0≤10%; and P is a pitch of the pixels 12. The display method includes controlling a light-emitting state of the light-emitting units 21a to realize a 2D display or a 3D display. For example, all of the light-emitting units 21a are controlled to be turned on to realize the 2D display; or, a portion of the light-emitting units 21a are controlled to be turned on and the other portion of the light-emitting units 21a are controlled to be turned off to achieve 2D display or 3D display. For example, in the method, the first panel 10 is controlled to be a display panel and the second panel 20 is controlled to be a backlight source; or, the first panel 10 is controlled to be a grating and the second panel 20 is controlled to be a display panel.

For example, a distance from the light-emitting units to the first panel is the first distance or the second distance, the plurality of light-emitting units included in the light-emitting plate include the light-emitting units respectively in a plurality of sub regions, and each of the sub regions includes a left eye region and a right eye region; light emitted from the light-emitting units in the left eye region is configured to reach the left eye of the viewer after respectively passing through the pixels of the first panel and not to reach the right eye of the viewer; and light emitted from the light-emitting units in the right eye region is configured to reach the right eye of the viewer after respectively passing through the pixels of the first panel and not to reach the left eye of the viewer.

For example, the distance from the light-emitting units included in the first light-emitting plate to the first panel is the first distance, each of the sub regions is provided with a 2D region, and the light emitted from each of the light-emitting units in the 2D region is configured to reach the left eye and the right eye of the viewer after passing through a same pixel of the first panel. In such a situation, controlling the light-emitting state of the light-emitting units in the display method provided by at least one embodiment of the present disclosure includes: controlling the light-emitting units in the 2D region included in each of the sub regions to be turned on to realize the 2D display; or, controlling the light-emitting units in the 2D region included in each of the sub regions to be turned off and controlling the light-emitting units respectively in the left eye region and the right eye region of each sub region to be turned on to realize the 2D display. Or, for example, controlling the light-emitting state of the light-emitting units further includes: controlling the light-emitting units in the 2D region included in each of the sub regions to be turned off; and for the adjacent sub regions, controlling the light-emitting units respectively in the left eye region and the right eye region included in one sub region to be turned on and controlling the light-emitting units respectively in the left eye region and the right eye region included in the other sub region to be turned off, to achieve 3D display.

For example, the distance from the light-emitting units to the first panel is the second distance, each of the sub regions includes a 3D region, and the light emitted from each of the light-emitting units in the 3D region is configured to reach the left eye and the right eye of the viewer after passing through different pixels of the first panel. In such a situation, controlling the light-emitting state of the light-emitting units in the display method provided by at least one embodiment of the present disclosure includes: controlling the light-emitting units in the 3D region included in each of the sub regions to be turned on to realize the 2D display; or, controlling the light-emitting units respectively in the left eye region and the right eye region in each of the sub regions to be turned on and controlling the light-emitting units in the 3D region included in each of the sub regions to be turned off to realize the 2D display; or for the adjacent sub regions, controlling the light-emitting units in the 3D region included in one sub region to be turned on and controlling the light-emitting units in the 3D region included in the other sub region to be turned off to achieve 3D display.

For example, the distance from the light-emitting units to the first panel is the third distance H3, the plurality of light-emitting units included in the light-emitting plate include the light-emitting units respectively in a plurality of sub regions, and each of the sub regions includes a dark region and a 3D region; the light emitted from each of the light-emitting units in the 3D region is configured to reach the left eye and the right eye of the viewer after passing through different pixels of the first panel, and both the left eye and the right eye of the viewer are unable to see the light from the dark region; and a ratio of a width of the 3D region to a width of the dark region is (P−B)/B. In such a situation, in the display method provided by at least one embodiment of the present disclosure, controlling the light-emitting state of the light-emitting units includes: controlling the light-emitting units in the 3D region included in each of the sub regions to emit light to realize the 2D display; or for the adjacent sub regions, controlling the light-emitting units in 3D region included in one sub region to emit light and controlling the light-emitting units included in the other sub region not to emit light to achieve 3D display.

The embodiments of the display method can be referred to the related descriptions in the embodiments of the display device, and detailed descriptions will be omitted herein. Besides, in the case of no conflict, the embodiments of the disclosure and the characteristics of the embodiments can be combined with each other.

What are described above is related to the illustrative embodiments of the disclosure only and not limitative to the scope of the disclosure. The scopes of the disclosure are defined by the accompanying claims.

The application claims priority of Chinese Patent Application No. 201610772867.8 filed on Aug. 30, 2016, the disclosure of which is incorporated herein by reference in its entirety as part of the present application.

What is claimed is:

1. A display device, comprising:
a first panel, wherein the first panel comprises a plurality of light-blocking units and a plurality of pixels, and each of the light-blocking units is between the pixels adjacent to each other; and
a second panel, wherein the second panel comprises a first light-emitting plate, the first light-emitting plate comprises a plurality of light-emitting units, and a distance from the light-emitting units of the first light-emitting plate to the first panel is one of a first distance H1=BS/(L−B), a second distance H2=(P−B)S/(L−P+B), and a third distance H3=PS/(L−P),
wherein
B is a width, between the pixels adjacent to each other, of each of the light-blocking units, B0−b≤B≤B0+b, B0 is an optimum width of each of the light-blocking units between the pixels adjacent to each other, b is a maximum allowable deviation of each of the light-blocking units relative to the B0, and b/B0≤50%;
S is a viewing distance for a viewer, and S0−s≤S≤S0+s, S0 is an optimum viewing distance, s is a maximum allowable back-or-forth deviation relative to the optimum viewing distance S0, and s/S0≤20%;
L is a pupillary distance between a left eye and a right eye of the viewer, L0−l≤L≤L0+l, L0 is an optimum pupillary distance, l is a maximum deviation relative to the optimum pupillary distance L0, and l/L0≤10%; and
P is a pitch of the pixels of the first panel,
wherein the second panel further comprises a second light-emitting plate, the second light-emitting plate comprises a plurality of light-emitting units, and a distance from the light-emitting units included in the second light-emitting plate to the first panel is one of the first distance H1, the second distance H2, and the third distance H3 and is different from the distance from the light-emitting units included in the first light-emitting plate to the first panel, wherein, S remains the same in the first distance H1=BS/(L−B), the second distance H2=(P−B)S/(L−P+B), and the third distance H3=PS/(L−P).

2. The display device according to claim 1, wherein the distance from the light-emitting units to the first panel is a distance from a plane provided with upper surfaces of the light-emitting units to a plane provided with upper surfaces of the light-blocking units of the first panel.

3. The display device according to claim 1, wherein the second light-emitting plate is at a side of the first light-emitting plate away from the first panel, and the first light-emitting plate is a transparent light-emitting substrate.

4. The display device according to claim 3, wherein the second panel further comprises a third light-emitting plate, the third light-emitting plate comprises a plurality of light-emitting units, and a distance from the light-emitting units included in the third light-emitting plate to the first panel is one of the first distance H1, the second distance H2, and the third distance H3 and is different from both the distance from the light-emitting units included in the first light-emitting plate to the first panel and the distance from the light-emitting units included in the second light-emitting plate to the first panel.

5. The display device according to claim 1, further comprising a frame, wherein the frame comprises a first installation component and a second installation component, the first installation component is configured to receive the first light-emitting plate, and the second installation component is configured to receive the second light-emitting plate.

6. The display device according to claim 5, wherein the frame further comprises a distance adjustment component, and the distance adjustment component is configured to adjust at least one of a distance from the first installation component to the first panel and a distance from the second installation component to the first panel.

7. The display device according to claim 1, wherein the distance from the light-emitting units of the first light-emitting plate to the first panel is configured to be switched among the first distance, the second distance, and the third distance.

8. The display device according to claim 7, further comprising an amplifier component, wherein the amplifier component is between the first panel and the first light-emitting plate of the second panel, and the amplifier component is configured to comprise a plurality of convex lens equivalents in a case that the first light-emitting plate is at the second distance or the third distance.

9. The display device according to claim 1, wherein the distance from the light-emitting units included in the first light-emitting plate to the first panel is the third distance H3, the plurality of light-emitting units comprises, the light-emitting units in a plurality of sub regions, each of the sub regions comprises a dark region and a 3D region, light emitted from each of the light-emitting units in the 3D region is configured to reach the left eye of the viewer and the right eye of the viewer after passing through different pixels of the first panel, and light from the dark region is configured not to reach both the left eye of the viewer and the right eye of the viewer; and a ratio of a width of the 3D region to a width of the dark region is (P−B)/B.

10. A display device, comprising:
a first panel, wherein the first panel comprises a plurality of light-blocking units and a plurality of pixels, and each of the light-blocking units is between the pixels adjacent to each other; and a second panel, wherein the second panel comprises a first light-emitting plate, the first light-emitting plate comprises a plurality of light-emitting units, and a distance from the light-emitting units of the first light-emitting plate to the first panel is one of a first distance H1=BS/(L−B), a second distance H2=(P−B)S/(L−P+B), and a third distance H3=PS/(L−P), wherein B is a width, between the pixels adjacent to each other, of each of the light-blocking units, B0−b≤B≤B0+b, B0 is an optimum width of each of the light-blocking units between the pixels adjacent to each other, b is a maximum allowable deviation of each of the light-blocking units relative to the B0, and b/B0≤50%;

S is a viewing distance for a viewer, and S0−s≤S≤S0+s, S0 is an optimum viewing distance, s is a maximum allowable back-or-forth deviation relative to the optimum viewing distance S0, and s/S0≤20%;

L is a pupillary distance between a left eye and a right eye of the viewer, L0−l≤L≤L0+l, L0 is an optimum pupillary distance, l is a maximum deviation relative to the optimum pupillary distance L0, and l/L0≤10%; and P is a pitch of the pixels of the first panel, wherein the distance from the light-emitting units included in the first light-emitting plate to the first panel is the first distance or the second distance, the plurality of light-emitting units comprises the light-emitting units in a plurality of sub regions, and each of the sub regions comprises a left eye region and a right eye region;

light emitted from the light-emitting units in the left eye region is configured to reach the left eye of the viewer after passing through the pixels of the first panel and not to reach the right eye of the viewer; and light emitted from the light-emitting units in the right eye region is configured to reach the right eye of the viewer after passing through the pixels of the first panel, and not to reach the left eye of the viewer.

11. The display device according to claim 10, wherein the distance from the light-emitting units included in the first light-emitting plate to the first panel is the first distance, each of the sub regions is provided with a 2D region, and light emitted from each of the light-emitting units in the 2D region is configured to reach the left eye of the viewer and the right eye of the viewer after passing through a same pixel of the first panel.

12. The display device according to claim 11, wherein both a width of the left eye region and a width of the right eye region are LB/(L−B), and a width of the 2D region is L(P−2B)/(L−B).

13. The display device according to claim 10, wherein the distance from the light-emitting units included in the first light-emitting plate to the first panel is the second distance, each of the sub regions is provided with a 3D region, and light emitted from each of the light-emitting units in the 3D region is configured to reach the left eye of the viewer and the right eye of the viewer after passing through different pixels of the first panel.

14. The display device according to claim 13, wherein both a width of the left eye region and a width of the right eye region are LB/(L−P+B), and a width of the 3D region is L(P−2B)/(L−P+B).

15. A display method of a display device, wherein
the display device comprises a first panel and a second panel, the first panel comprises a plurality of light-blocking units and a plurality of pixels each of the light-blocking units is between the pixels adjacent to each other, the second panel comprises a light-emitting plate, the light-emitting plate comprises a plurality of light-emitting units, and a distance from the light-emitting units to the first panel is one of a first distance $H1=BS/(L-B)$, a second distance $H2=(P-B)S/(L-P+B)$, and a third distance $H3=PS/(L-P)$, wherein B is a width of each of the light-blocking units between the pixels adjacent to each other, $B0-b \leq B \leq B0+b$, B0 is an optimum width of each of the light-blocking units between the pixels adjacent to each other, b is a maximum allowable deviation of the light-blocking units relative to B0, and $b/B0 \leq 50\%$; S is a viewing distance for a viewer, $S0-s \leq S \leq S0+s$, S0 is an optimum viewing distance, s is a maximum allowable back-or-forth deviation relative to the optimum viewing distance S0, and $s/S0 \leq 20\%$; L is a pupillary distance between a left eye and a right eye of the viewer, $L0-l \leq L \leq L0+l$, L0 is an optimum pupillary distance, l is a maximum deviation relative to the optimum pupillary distance L0, and $l/L0 \leq 10\%$; and P is a pitch of the pixels of the first panel; and the display method comprises: controlling a light-emitting state of the light-emitting units to make the display device realize a 2D display or a 3D display, wherein a distance from the light-emitting units to the first panel is the first distance or the second distance, the plurality of light-emitting units comprise the light-emitting units in a plurality of sub regions, and each of the sub regions comprises a left eye region and a right eye region;

light emitted from the light-emitting units in the left eye region is configured to reach the left eye of the viewer after passing through the pixels of the first panel, and not to reach the right eye of the viewer; and light emitted from the light-emitting units in the right eye region is configured to reach the right eye of the viewer after passing through the pixels of the first panel, and not to reach the left eye of the viewer.

16. The display method according to claim 15, wherein the distance from the light-emitting units to the first panel is the first distance, each of the sub regions is provided with a 2D region, light emitted from each of the light-emitting units in the 2D region is configured to reach the left eye of the viewer and the right eye of the viewer after passing through a same pixel of the first panel, and the controlling the light-emitting state of the light-emitting units comprises:

controlling the light-emitting units in the 2D region included in each of the sub regions to be turned on to realize the 2D display; or controlling the light-emitting units in the 2D region included in each of the sub regions to be turned off and controlling the light-emitting units in the left eye region and the right eye region of each of the sub regions to be turned on, to realize the 2D display; or controlling the light-emitting units in the 2D region included in each of the sub regions to be turned off; and for the sub regions adjacent to each other, controlling the light-emitting units in the left eye region and the right eye region which are included in one sub region to be turned on, and controlling the light-emitting units in the left eye region and the right eye region which are included in the other sub region to be turned off, to achieve the 3D display.

17. The display method according to claim 15, wherein the distance from the light-emitting units to the first panel is the second distance, each of the sub regions is provided with a 3D region, light emitted from each of the light-emitting units in the 3D region is configured to reach the left eye of the viewer and the right eye of the viewer after passing through different pixels of the first panel, and the controlling the light-emitting state of the light-emitting units comprises:

controlling the light-emitting units in the 3D region included in each of the sub regions to be turned on to realize the 2D display; or controlling the light-emitting units in the left eye region and the right eye region of each of the sub regions to be turned on and controlling the light-emitting units in the 3D region included in each of the sub regions to be turned off, to realize the 2D display; or for the sub regions adjacent to each other, controlling the light-emitting units in the 3D region included in one sub region to be turned on and controlling the light-emitting units in the 3D region included in the other sub region to be turned off, to achieve the 3D display.

* * * * *